United States Patent [19]

Cooper et al.

[11] 4,369,678

[45] Jan. 25, 1983

[54] TOOL AND OPERATOR HEAD FOR A TOOL-OPERATED LOCK

[75] Inventors: Donald L. Cooper; Gordon G. Zeidman, both of Columbus, Ohio

[73] Assignee: The Eastern Company, Cleveland, Ohio

[21] Appl. No.: 199,559

[22] Filed: Oct. 22, 1980

[51] Int. Cl.³ .............................................. B25B 13/00
[52] U.S. Cl. .................................. 81/90 C; 411/407; 411/500
[58] Field of Search ................ 81/90 B; 411/378, 405, 411/407, 500

[56] References Cited

U.S. PATENT DOCUMENTS

| | | | |
|---|---|---|---|
| Re. 22,681 | 10/1945 | Bugg . | |
| Re. 27,616 | 4/1973 | Diaz . | |
| 150,091 | 4/1874 | Smith . | |
| 1,624,767 | 4/1927 | Schwemlein . | |
| 1,715,032 | 5/1929 | Hoegger . | |
| 2,286,950 | 6/1942 | Breedlove . | |
| 2,340,864 | 2/1944 | Carpenter . | |
| 2,362,999 | 11/1944 | Hewitt . | |
| 2,372,269 | 3/1945 | Golan . | |
| 2,397,216 | 3/1946 | Stellin . | |
| 2,437,381 | 3/1948 | Cullen . | |
| 2,445,525 | 7/1948 | Gulden . | |
| 2,451,747 | 10/1948 | Kindt . | |
| 2,458,391 | 1/1949 | Lavietes . | |
| 2,500,653 | 3/1950 | Berg . | |
| 2,676,479 | 4/1954 | Bethune . | |
| 2,708,844 | 5/1955 | Cincel . | |
| 2,741,289 | 4/1956 | Grow . | |
| 2,770,998 | 11/1956 | Schwartz . | |
| 2,813,450 | 11/1957 | Dzus . | |
| 2,839,322 | 6/1958 | Kirk . | |
| 2,847,894 | 8/1958 | Smith et al. . | |
| 2,848,024 | 8/1958 | Smith et al. . | |
| 2,969,250 | 1/1961 | Kull . | |
| 3,023,041 | 2/1962 | Pluylaar . | |
| 3,034,386 | 5/1962 | Corlett et al. . | |
| 3,060,785 | 10/1962 | Corlett et al. . | |
| 3,060,786 | 10/1962 | Flower . | |
| 3,065,012 | 11/1962 | Trotter . | |
| 3,088,140 | 5/1963 | Carlson . | |
| 3,106,862 | 10/1963 | Briles . | |
| 3,116,081 | 12/1963 | Goodridge . | |
| 3,122,963 | 3/1964 | Borgeson . | |
| 3,146,010 | 8/1964 | Dellith . | |
| 3,174,383 | 3/1965 | Heil . | |
| 3,190,169 | 6/1965 | Rosan . | |
| 3,213,719 | 10/1965 | Kloack . | |
| 3,222,976 | 12/1965 | Holman . | |
| 3,236,141 | 2/1966 | Smith . | |
| 3,236,275 | 2/1966 | Smith . | |
| 3,237,436 | 3/1966 | Williams . | |
| 3,241,408 | 3/1966 | McCauley . | |
| 3,244,442 | 4/1966 | Arbogast . | |
| 3,279,838 | 10/1966 | Hamilton . | |
| 3,282,145 | 11/1966 | Prescott . | |
| 3,302,672 | 2/1967 | Walton . | |
| 3,354,756 | 11/1967 | Rusk .................................... | 81/90 B |
| 3,363,500 | 1/1968 | Simko . | |
| 3,368,443 | 2/1968 | Faul . | |
| 3,369,441 | 2/1968 | Kosar . | |
| 3,379,231 | 4/1968 | Gallo, Sr. . | |
| 3,411,396 | 11/1968 | Herpich . | |
| 3,446,046 | 5/1969 | Randel . | |
| 3,449,988 | 6/1969 | Gallo, Sr. . | |
| 3,463,209 | 8/1969 | Podolsky . | |
| 3,470,786 | 10/1969 | Martins . | |
| 3,492,841 | 2/1970 | Ipri . | |
| 3,498,173 | 3/1970 | Wright . | |
| 3,519,979 | 7/1970 | Bodenstein . | |
| 3,549,184 | 12/1970 | Anderson . | |
| 3,575,080 | 4/1971 | Hannay . | |
| 3,604,487 | 9/1971 | Gilbert . | |
| 3,656,396 | 4/1972 | Gutshall . | |
| 3,658,105 | 4/1972 | Burt et al. . | |
| 3,674,075 | 7/1972 | Hoegee . | |
| 3,695,321 | 10/1972 | Garehime, Jr. . | |
| 3,730,048 | 5/1973 | Okada . | |
| 3,738,136 | 6/1973 | Falk . | |
| 3,763,725 | 10/1973 | Reiland . | |
| 3,808,937 | 5/1974 | Roehrig . | |
| 3,812,757 | 5/1974 | Reiland . | |
| 3,821,975 | 7/1974 | Haker . | |
| 3,859,888 | 1/1975 | Okada . | |
| 3,861,770 | 1/1975 | Horak ............................ | 81/90 C X |
| 3,865,007 | 2/1975 | Stanback . | |
| 3,872,904 | 3/1975 | Barlow . | |
| 3,874,258 | 4/1975 | Semola et al. . | |
| 3,888,144 | 6/1975 | Parsons . | |
| 3,892,031 | 7/1975 | Bisbing . | |
| 3,921,494 | 11/1975 | Coe . | |
| 3,929,152 | 12/1975 | Graham . | |

| | | |
|---|---|---|
| 3,935,877 | 2/1976 | Franceschi . |
| 3,967,432 | 7/1976 | Starr . |
| 3,978,614 | 9/1976 | Goldhaber . |
| 4,006,660 | 2/1977 | Yamamoto et al. . |
| 4,018,111 | 4/1977 | Goldhaber . |
| 4,025,140 | 5/1977 | Matys . |
| 4,027,572 | 6/1977 | Burge . |
| 4,033,003 | 7/1977 | Marroquin . |
| 4,033,244 | 7/1977 | Jacobson . |
| 4,037,514 | 7/1977 | Lliteras . |
| 4,047,266 | 9/1977 | Bisbing . |
| 4,079,643 | 3/1978 | Evans . |
| 4,091,708 | 5/1978 | Jacobson . |
| 4,128,038 | 12/1978 | Urwin . |
| 4,145,978 | 3/1979 | Johnson et al. . |
| 4,146,073 | 3/1979 | Lliteras . |

*Primary Examiner*—James G. Smith
*Attorney, Agent, or Firm*—David A. Burge Co.

[57] ABSTRACT

An operator head has a slotted outer surface with the configuration of a truncated cone, and an end surface having a semispherical recess formed therein. A tool has opposed driving arms which are insertable into the slots of the operator head to drivingly connect the tool and the operator head. A detent formation carried on the tool is received in the semispherical recess when the tool and head are drivingly connected to assist in retaining the tool on the operator head.

7 Claims, 12 Drawing Figures

TOOL AND OPERATOR HEAD FOR A TOOL-OPERATED LOCK

CROSS-REFERENCE TO RELATED APPLICATIONS

ONE-PIECE OPERATOR HEAD FOR A TOOL-OPERATED LOCK, design patent application Ser. No. 199,548, filed Oct. 22, 1980, by Gordon G. Zeidman.

TWO-PIECE OPERATOR HEAD FOR A TOOL-OPERATED LOCK, design patent application Ser. No. 199,549, filed Oct. 22, 1980, by Edwin W. Davis and Gordon G. Zeidman.

BACKGROUND OF THE INVENTION

1. Field of the Invention

The present invention generally relates to a tool and an operator head of the type which may be utilized to impart torque forces to a rotatable member, and, more particularly, to a tool and operator head which are particularly well suited for use on a tool-operated lock.

2. Prior Art

Tool-operated locks are used on a wide variety of industrial cabinets and the like, for example where hazardous electrical voltages are present in electronic data processing equipment. The purpose of a tool-operated lock is not to prevent or to make access difficult to authorized personnel, but to discourage casual intrusion by machine operators or passersby.

Tools and operator heads of a wide variety of configurations have been proposed for use in many applications where torque forces are to be applied to rotatable members. Screwdriver-like tools having tips configured to drivingly engage specially configured operator heads are well known. Wrench-like tools having opposed surfaces for drivingly engaging opposite side portions of operator heads are also well known.

A problem with most previously proposed tool and operator head configurations is that, when they are drivingly interengaged, there is nothing which serves to releasably retain them in driving engagement. Accordingly, most previously proposed tools cannot be retained on an operator head in the manner in which a key is releasably retained by a lock. Each time an operator head is to be rotated, the appropriate tool must be located and re-engaged with the operator head.

Still another problem with many previously proposed tool and operator head configurations is that the tools may readily slip relative to the operator head during use, causing damage to surrounding surfaces and possibly resulting in injuries.

SUMMARY OF THE INVENTION

The present invention overcomes the foregoing and other drawbacks of prior proposals by providing novel and improved tool and operator head configurations which cooperate to releasably retain the tool on the operator head.

In accordance with the preferred practice of the present invention, a tool and operator head are provided wherein the operator head has an outer surface of truncated-cone shape. A pair of tool-receiving slots are formed in opposite sides of the outer surface of the truncated cone. A dimple-like recess is provided in the end of the head. The tool has opposed driving arms which may be inserted into the opposed slots to drivingly interconnect the tool and the head. The tool also has a detent which is received by the dimple-like recess when the tool drivingly interengages the operator head to releasably retain the tool in place on the head.

A feature of the operator head lies in its use of an outer surface of truncated-cone shape which cannot be easily grasped by one's fingers for rotation, or by conventional tools such as wrenches and pliers.

These and other features and a fuller understanding of the invention may be had by referring to the following description and claims taken in conjunction with the accompanying drawings.

DESCRIPTION OF THE PREFERRED EMBODIMENT

Figure 1:
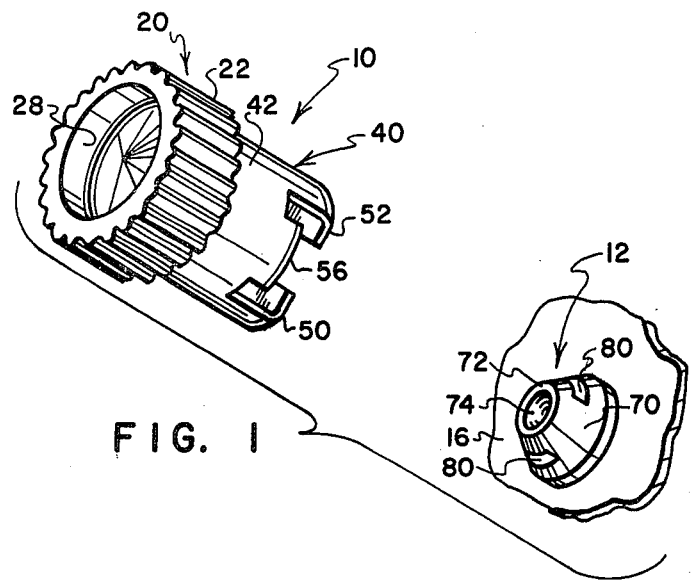
FIG. 1 is a perspective view of a tool and one embodiment of an operator head, these components being shown disconnected from each other, the operator head being shown in position adjacent a plate of a cabinet or closure.
Figure 2:
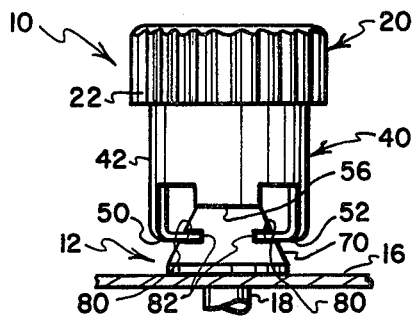
FIG. 2 is an end elevational view of the tool drivingly engaging the operator head of FIG. 1.
Figure 3:
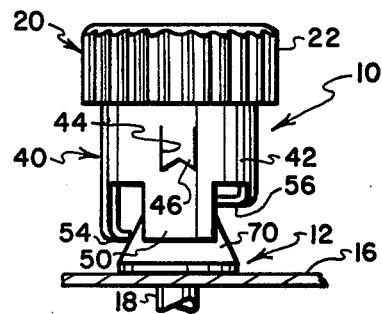
FIG. 3 is a side elevational view of the tool drivingly engaging the operator head of FIG. 1.
Figure 4:
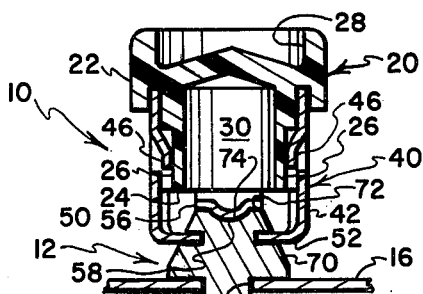
FIGS. 4 and 5 are sectional views as seen from planes indicated by lines 4—4 and 5—5 in FIGS. 3 and 2, respectively.
Figure 5:
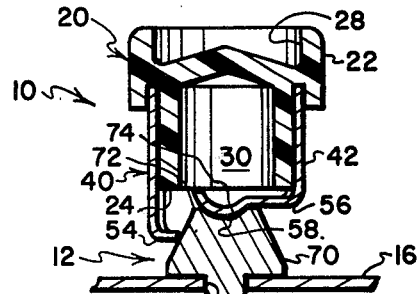
Figure 6:
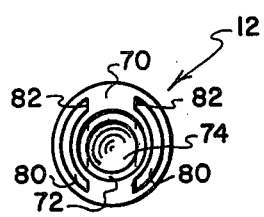
FIG. 6 is a top plan view of the operator head of FIG. 1.
Figure 7:
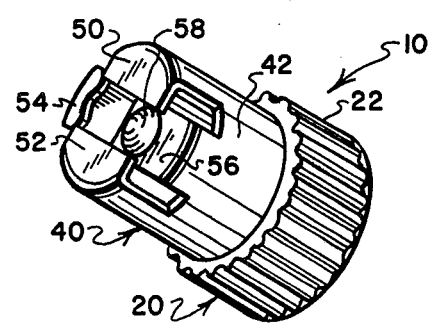
FIG. 7 is a perspective view of the tool.
Figure 8:
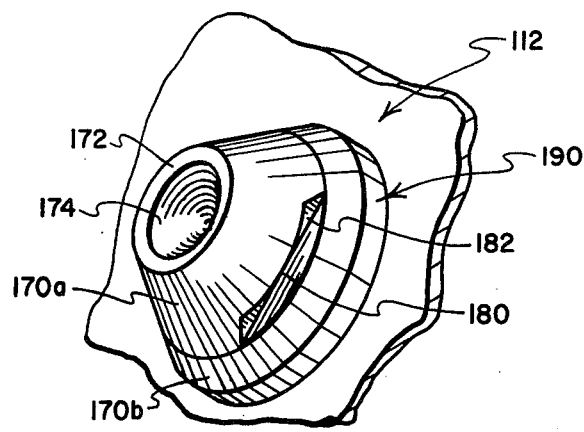
FIG. 8 is a perspective view of a preferred embodiment of operator head for use with the tool.
Figure 9:
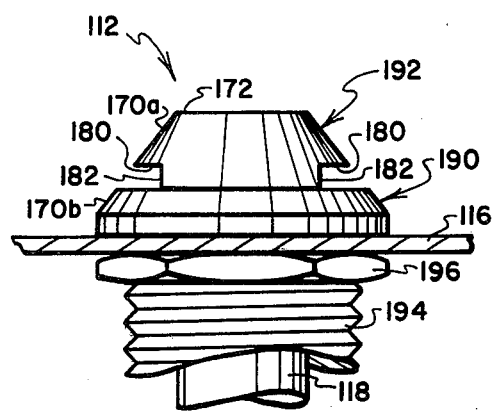
FIG. 9 is a right or left side elevational view of the operator head of FIG. 8.
Figure 10:
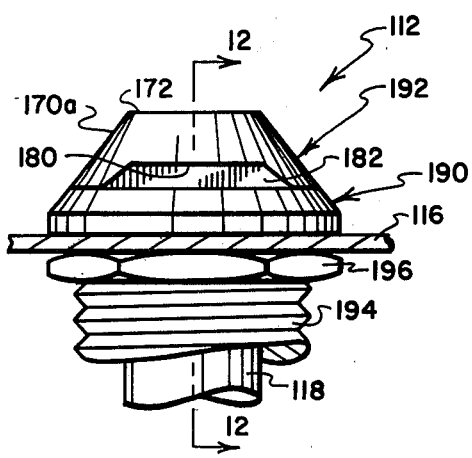
FIG. 10 is a front or rear side elevational view of the operator head of FIG. 8.
Figure 11:
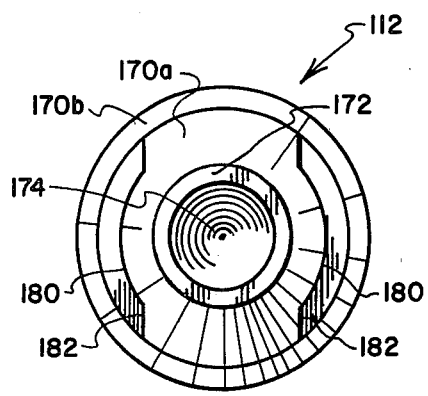
FIG. 11 is a top plan view of the operator head of FIG. 8.
Figure 12:
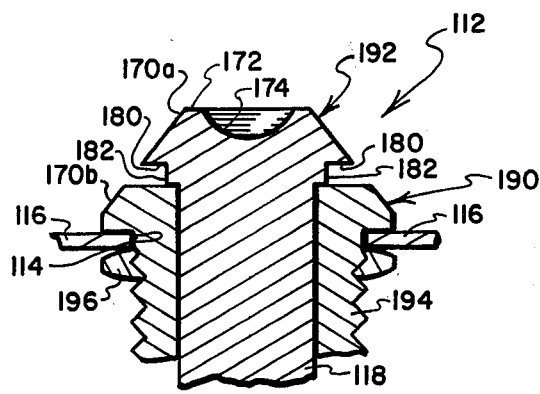
FIG. 12 is a sectional view as seen from a plane indicated by a line 12—12 in FIG. 10.

Referring to FIGS. 1–5, a tool and one embodiment of an operator head are indicated respectively by the numerals 10, 12. The tool 10 is configured to drivingly engage the operator head 12, as is illustrated in FIGS. 2–5. Referring to FIGS. 4 and 5, the operator head 12 is typically positioned adjacent a hole 14 formed through a plate 16. The head 12 typically has an integrally formed stem 18 which extends through the hole 14 for retaining or a rotatable structure such as a lock actuator of conventional configuration (not shown). The plate 16 may constitute a part of a cabinet, a closure, or other structure which houses a member which is to be rotated by the stem 18.

The tool 10 is of two-piece construction including a base 20 formed from plastics material, and a head-engaging member 40 formed from hardened metal. The base 20 has an upper end region with a knurled, perimetrically-extending outer surface 22, and a lower end region in the form of a cylindrical hub 24. A pair of axially extending recesses 26 are formed in opposite sides of the outer surface of the hub 24. Both of the end regions are hollow, as is indicated by the numerals 28, 30 to minimize the quantity of plastics material needed to form the base 20.

The head-engaging member 40 has an upstanding cylindrical portion 42 which is press-fitted onto the hub 24. Opposite side portions of the upstanding portion 42 are severed by M-shaped cuts 44, one of which is visible in FIG. 3. Inwardly extending projections 46 are formed from the cut side portions 44. The projections 46 extend into the hub recesses 26 to provide a positive driving connection between the base 20 and the member 40, and to assist in retaining the member 40 in position on the base 20.

The head-engaging member 40 has four inwardly turned arm-like members 50, 52, 54, 56 near its lower end. The arms 50, 52 define spaced, opposed driving members which are insertable into slots formed on the operator head 12, as will be described. The arm 54 serves as a stop to locate the tool 10 on the head 12, as will be described. The arm 56 carries a rounded, concave projection 58 which is engageable with a semispherically-shaped recess formed in the operator-head, as will be described. The arm 56 is elongate and serves to resiliently support the projection 58.

The operator head 12 has an outer surface 70 of truncated cone shape, and an end surface 72 formed near the smaller end of the truncated cone. A semispherically-shaped recess 74 is formed in the end surface 72.

A pair of slots 80 are formed in opposite sides of the truncated-cone-shaped surface 70 to receive the driving arms 50, 52 of the tool 10. The slots 80 have bottom wall portions 82 which parallel each other and which engage the driving arms 50, 52 when the tool 10 is installed on the head 12.

Referring to FIGS. 8–12, a preferred embodiment of operator head is indicated generally by the numeral 112. The head 112 is of 2-piece construction including a mounting part 190 and an operational part 192 which has a stem 118 that is journaled by the mounting part 190.

The mounting part 190 has a threaded base 194 which extends through a hole 114 formed in a plate 116. A nut 196 is threaded onto the mounting part 190 and serves to hold the mounting part 190 in place relative to the plate 116. The plate 116 may constitute a part of a cabinet, a closure, or other structure which houses a member which is to be rotated by the stem 118. The preferred employment of the operator head 112 is as a device for effecting rotation of a conventionally configured lock actuator (not shown), whereby the operator-head 112 and tool 10 provide a lock with a tool-operated actuation system.

The operator head 112 has an outer appearance that is quite similar to that of the operator head 12, the only notable difference being that the operator head 112 is of two-piece construction, while the operator head 12 is of one-piece construction. The operator head 112 has an outer surface of truncated cone shape, one part 170a of which is provided on the operational part 192, and the other part 170b of which is provided on the mounting part 190. An end surface 172 is formed near the smaller end of the truncated cone. A semispherically-shaped recess 174 is formed in the end surface 72.

A pair of slots 180 are formed in opposite sides of the truncated-cone-shaped-surface part 170a adjacent the juncture of the parts 170a, 170b. The slots 180 have bottom wall portions 182 which parallel each other and which engage the driving arms 50, 52 where the tool 10 is installed on the head 112.

Installation of the tool 10 on either of the heads 12, 112 is effected by sliding the arms 50, 52 into the slots 80 or 180 to bring the arms 50, 52 into driving engagement with the bottom wall portions 82 or 182. As the tool 10 is being installed in this manner, the resilient arm 56 deflects slightly to permit the projection 58 to slide across the end surface 72, 172, and then biases the projection 58 into receiving relationship with the semispherical recess 74 or 174. Installation of the tool 10 is completed when the projection 58 is received in the recess 74 or 174 and the arm 54 engages the surface 70 or 170a. As will be readily understood, the arm 54 serves as a stop to help in properly locating the tool 10 on either of the heads 12, 112.

While the invention has been described with reference to a tool-operated lock application, it will be understood that the tool and operator head configuration of the present invention can be utilized in conjunction with rotatably driven members of a wide variety of types. In short, principles of the invention can be utilized in many applications where torque forces are to be applied to a rotatable member. The operator head configuration of the present invention is adapted to inhibit operation by those not in possession of an appropriately configured operating tool. The tool of the present invention is designed to securely, releasably, drivingly connect with the operator head, and to retain itself in position on an operator head until removed therefrom.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A tool and operator head for rotating a rotatable member, comprising:
   (a) an operator head having an outer surface of truncated cone configuration, an end surface located near the smaller end of the truncated cone, and a pair of slots formed in opposite sides of the outer surface and defining a pair of parallel-extending driving surfaces at the bottoms of the slots;
   (b) a tool including structure defining a pair of spaced, opposed driving means which are insertable into the slots for engaging the driving surfaces for drivingly connecting the tool and the head; and,
   (c) detent means for releasably retaining the tool on the head including interfitting formation means on the tool and on the end surface which formation means are interfittingly engaged when the tool is drivingly connected to the head, and biasing means for biasing the interfitting formation means into engagement with each other.

2. The tool and operator head of claim 1 wherein the formation means include:
   (a) a rounded formation on the end surface; and,
   (b) a complimentarily rounded, mating formation formed on the tool for releasably receiving the rounded formation.

3. The tool and operator head of claim 2 wherein:
   (a) the rounded formation is a substantially semispherically-shaped recess; and,
   (b) the mating formation is a rounded, convex projection configured to be received within the recess.

4. The tool and operator of claim 2 wherein the biasing means includes means carried by the tool for resiliently supporting the rounded formation.

5. The tool and operator of claim 1 wherein the tool is formed as a two-piece structure including a base of plastics material which provides a handle that can be grasped by an operator, and a head-engaging member formed from metal and providing the structure which defines the spaced, opposed driving means.

6. A tool and operator a head for rotating a rotatable member, comprising:
   (a) an operator head having an outer surface of truncated cone configuration, an end surface located near the smaller end of the truncated cone, and a pair of slots formed in opposite sides of the outer surface and defining a pair of parallel-extending driving surfaces at the bottoms of the slots;
   (b) a tool including structure defining a pair of spaced, opposed driving means which are insertable into the slots for engaging the driving surfaces for drivingly connecting the tool and the head;
   (c) detent means for releasably retaining the tool on the head including interfitting formation means on the tool and on the end surface which formation means are interfittingly engaged when the tool is drivingly connected to the head;
   (d) the tool being formed as a two-piece structure including a base of plastics material which provides a handle that can be grasped by an operator, and a head-engaging member formed from metal and providing the structure which defines the spaced, opposed driving means; and,
   (e) the head-engaging member having four arm-shaped projections thereon, two of which define the driving means, a third one of which defines a stop configured to engage the outer surface of the operator head when the tool is in place on the operator head, and the fourth one of which carries the tool's formation means.

7. The tool and operator of claim 5 wherein the base has a pair of recesses formed in opposite sides thereof, and the head-engaging member has opposed projections which extend into the pair of recesses to drivingly interconnect the base and the head-engaging member.

* * * * *